Figure 1:
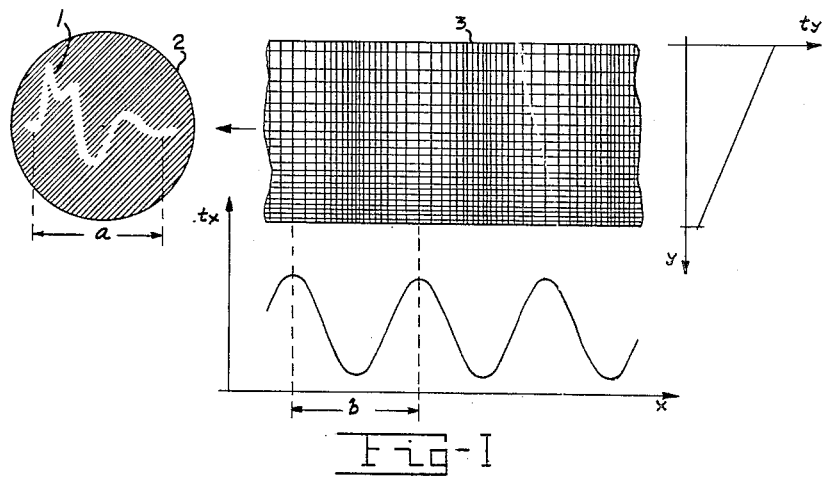

Jan. 14, 1958

H. P. RAABE 2,820,173

SPECTRUM ANALYZER

Filed Aug. 3, 1955

5 Sheets-Sheet 1

INVENTOR.
HERBERT P. RAABE
BY *Wade Komity*
ATTORNEY
*James S. Shannon*
AGENT

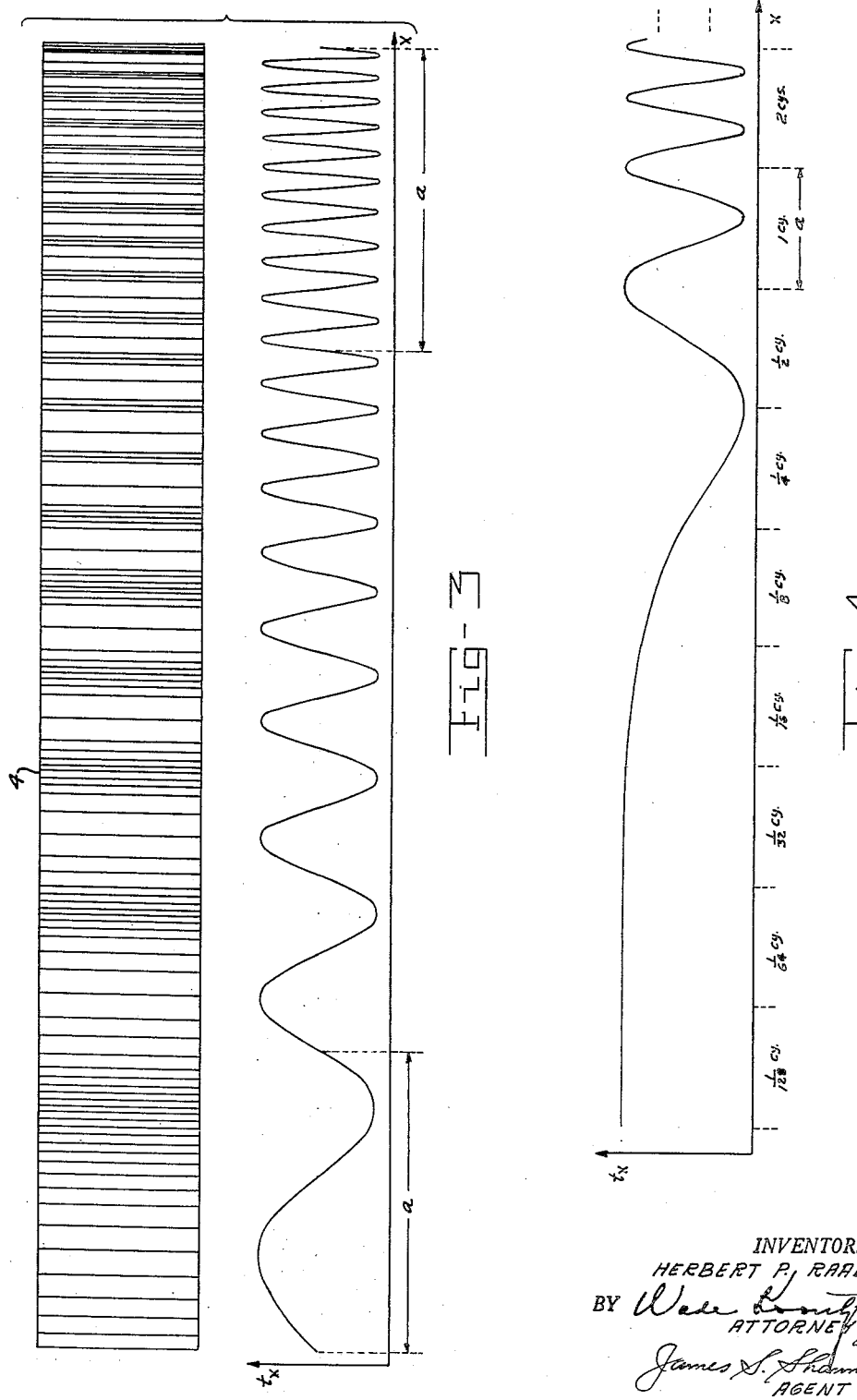

Jan. 14, 1958  H. P. RAABE  2,820,173
SPECTRUM ANALYZER
Filed Aug. 3, 1955  5 Sheets-Sheet 5

INVENTOR.
HERBERT P. RAABE
BY
ATTORNEY and
AGENT

United States Patent Office 2,820,173
Patented Jan. 14, 1958

2,820,173

SPECTRUM ANALYZER

Herbert Paul Raabe, Dayton, Ohio, assignor to the United States of America as represented by the Secretary of the Air Force Application August 3, 1955, Serial No. 526,339

10 Claims. (Cl. 315—9)

(Granted under Title 35, U. S. Code (1952), sec. 266)

The invention described herein may be manufactured and used by or for the United States Government for governmental purposes without payment to me of any royalty thereon.

This invention relates to the spectral analysis of non-periodic amplitude-time functions such as single electrical pulses and other electrical transients. It is the object of the invention to provide a computer for rapidly deriving the frequency spectrum of such a function.

Application of the mathematical process as a Fourier transformation to a nonperiodic amplitude-time function results in a corresponding amplitude-frequency function. It is known from this type of analysis that a nonperiodic function contains components of all frequencies, from zero to infinity, as compared with the discrete harmonically related components that are shown by a Fourier analysis to constitute a periodic function.

The Fourier transformation process consists in the multiplication of the amplitude-time function by a sinusoidal function and integration of the product. The frequency and the phase of the sinusoidal function determine the value of the integral, which is proportional to the amplitude of the spectrum component of that particular frequency and phase. In order to obtain the total frequency spectrum the frequency of the multiplying sinusoidal function must be varied over the respective band while the phase must be adjusted for maximum amplitude at each frequency. Since, as stated above, there are an infinite number of frequencies involved, this procedure would be of infinite length and therefore impossible for a practical computer. However, as a practical matter, a continuous spectrum is not required but only a sufficient number of points on the amplitude-frequency characteristic to define its shape. This may be accomplished by evaluating the Fourier integral at discrete frequencies not farther apart than the reciprocal of the duration of the time function. Therefore, stated more specifically, the object of the invention is to provide a computer that will rapidly evaluate the Fourier integral at a sufficient number of frequencies to define the shape of the amplitude-frequency function corresponding to a given amplitude-time function.

Briefly, the spectrum analyzer consists of an oscilloscope with persistent screen, an optical computer and an oscilloscope which presents the spectrum. The time function to be analyzed is stored on the persistent screen for a very short time during which multiplication with a sinusoidal function of varying frequency and phase takes place. The multiplication is achieved by means of a spatial optical filter which moves rapidly in the direction of the time axis and has an optical transparency that varies sinusoidally at a logarithmically increasing frequency. The oscilloscope used to store the time function likewise has a logarithmic sweep corresponding to the logarithmic frequency sweep of the filter. Light from the stored image passes through the filter and is collected by a photocell where integration takes place. The light passing through the filter must also be proportional to the amplitude of the time function, which is provided for by incorporating a grey wedge in the filter or by storing the time function in the form of a light area. The output of the photocell is finally applied to the vertical deflection circuit of the oscilloscope displaying the spectrum, the sweep of which is synchronized with and linearly related to the movement of the optical filter. In order to compensate for the decay of the image of the time function on the persistent screen, a second photocell is arranged to receive illumination directly from the screen and its output is used to control the amplitude of the voltage received from the integrating photocell before application to the final oscilloscope.

Figure 2:
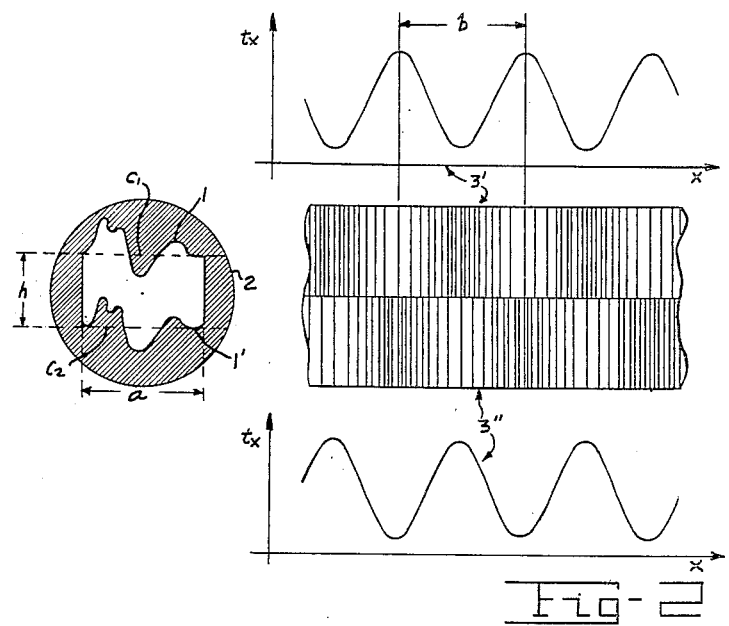
Figure 8:
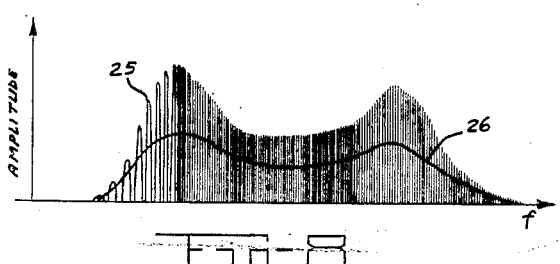
Figure 5:
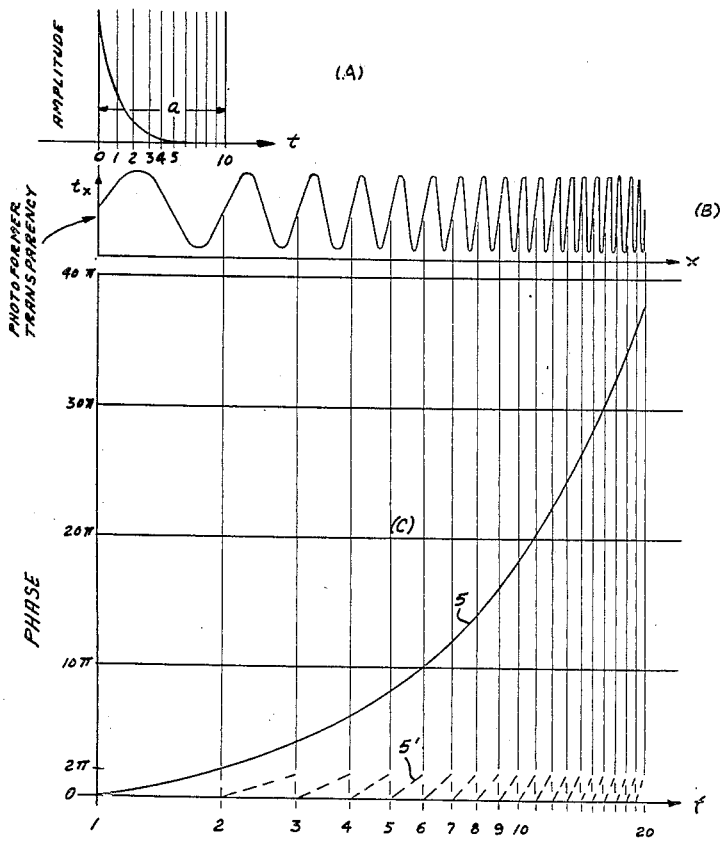
Figure 6:
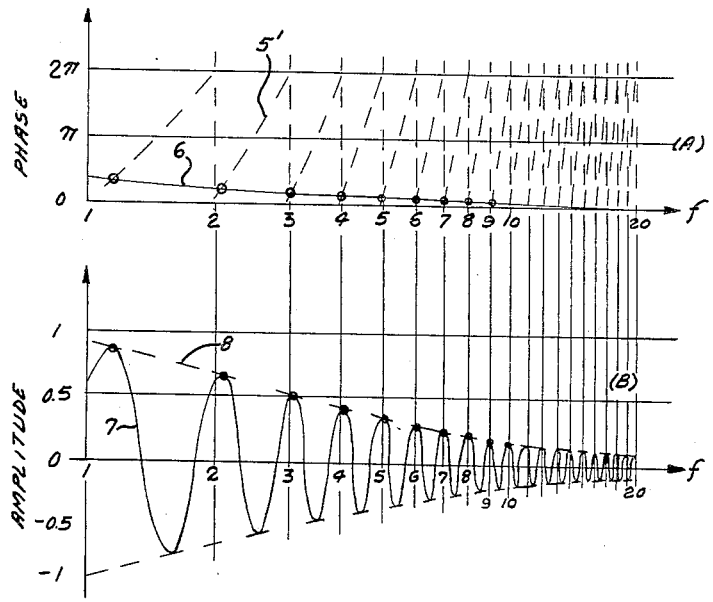
Figure 9:
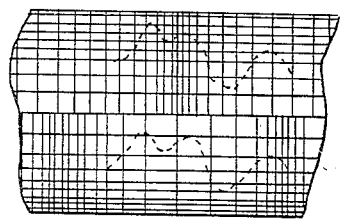
Figure 7:
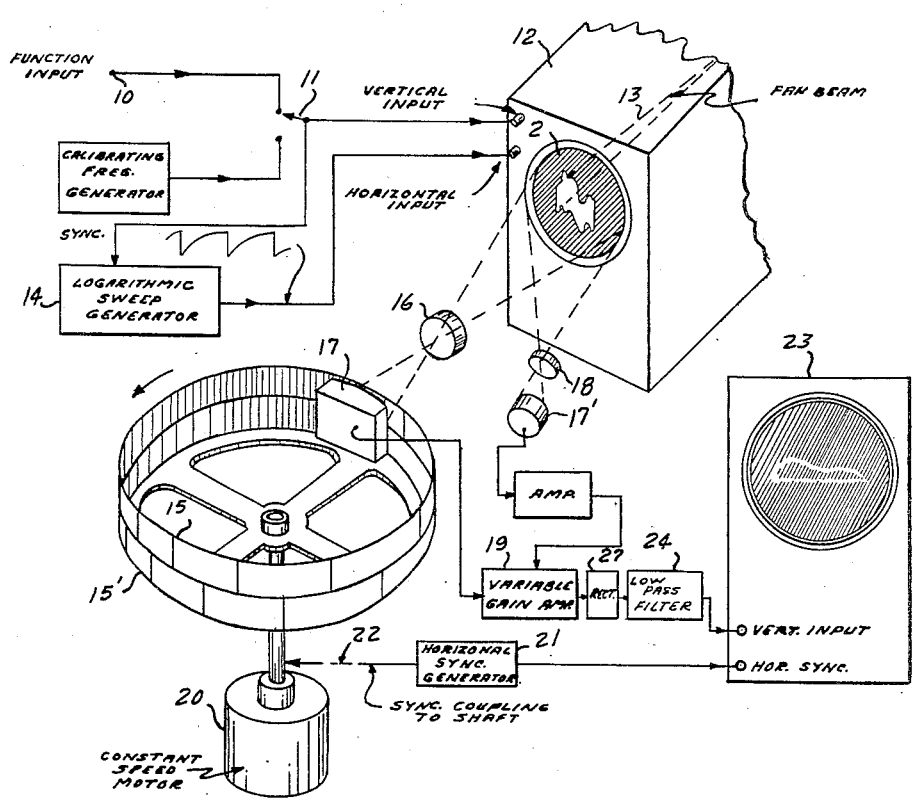
Figure 7A:
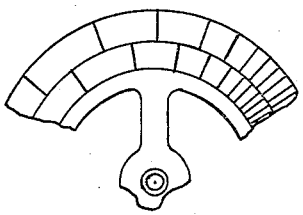

A more detailed description of the invention will be made in connection with the specific embodiments thereof shown in the accompanying drawings in which:

Fig. 1 illustrates the operation of the computer for a single frequency,

Fig. 2 is a refinement of Fig. 1 correcting errors due to finite length of the function time axis presentation, Fig. 3 shows a spatial optical filter covering a continuous band of frequencies, Fig. 4 shows the transparency variations at the low frequency end of a filter for investigating very low frequencies, Figs. 5 and 6 illustrate the phase-frequency scanning function occurring in the analyzer, Fig. 7 shows a complete analyzer, Fig. 7a shows an alternate embodiment of the optical filter, Fig. 8 illustrates the spectrum curve produced by the analyzer, and Fig. 9 illustrates a filter for use when the function is represented by a line.

Fig. 1 illustrates the basic features of the computer using a single frequency for simplicity. The time function 1 to be analyzed is displayed on the persistent screen 2 of an oscilloscope. The optical filter 3 has a transparency that varies in both the $x$ and $y$ directions in the manner illustrated. As indicated, the transparency $t_x$ along the $x$-axis varies sinusoidally and the transparency $t_y$ along the $y$-axis varies linearly. If the filter is passed across the face of the oscilloscope with its $x$-axis parallel to the time axis of function 1 the light passing through the filter will be proportional to the ordinate of the function due to linear transparency variation along the $y$-axis of the filter and will also be affected by the sinusoidal transparency variation along the $x$-axis. The result is a multiplication of the time function by the sinusoidal function. If the light passing the filter 3 is collected by a photocell, its output will be proportional to the integral of the above product and will vary between a maximum and a minimum value as the phase of the sinusoidal function varies due to movement of the filter. The maximum value of the photocell output is proportional to the amplitude of the component in the original time function having the frequency of the multiplying sinusoidal function. The value of this frequency is determined by the duration of the time function and the number of cycles of the sinusoidal transparency variation of the filter that are contained in the space along the time axis occupied by the function on the oscilloscope screen. This may be expressed as (1) $$f = \frac{a}{b} \cdot \frac{1}{D}$$

where $a$ = space occupied by time function along time axis,
$b$ = space occupied by one cycle of the sinusoidal transparency variation in the filter, and
$D$ = duration of the time function.

For example, in Fig. 1, $b=a$ so that one cycle of the sinusoidal transparency variation is contained in the distance $a$ on the oscilloscope. If $D=1/100$ sec., then $f=100$ c./s. and the maximum output of the photocell is proportional to the amplitude of the component of this frequency in the time function being analyzed. Within the practical limits $f$ may be varied by varying $a$.

The arrangement of Fig. 1 is an oversimplification and has an inherent defect. This results from the fact that with no function displayed on the screen of the oscilloscope but only the horizontal sweep or base line, the terminated base line nevertheless will be taken as a rectangular pulse and an output will be produced which is proportional to amplitude of the component of the particular frequency in the rectangular pulse. Consequently, the output obtained with the arrangement of Fig. 1 will be a superposition of the outputs resulting from evaluation of the Fourier integral for the time function to be analyzed and the Fourier integral for the rectangular pulse simulated by the base line. It is therefore necessary to eliminate the effect of the base line. This is accomplished by the arrangement shown in Fig. 2, which arrangement at the same time permits the use of a simpler filter.

Referring to Fig. 2, the oscilloscope in this case employs a fan beam having a vertical dimension $h$ at the screen but substantially zero thickness in the horizontal direction. With no vertical deflection of the beam it generates a rectangle of light extending equally above and below the horizontal center line of the persistent screen 2. The upper and lower edges of this rectangle form base lines $C_1$ and $C_2$. When the beam is vertically deflected by the time function to be analyzed the upper and lower edges of the beam develop the time function about the base lines $C_1$ and $C_2$, respectively. However, the function $1'$ developed about base line $C_2$ is opposite in phase to the function $1$ developed about base line $C_1$. The filter in this case is made of two strips $3'$ and $3''$ each of which has a sinusoidal transparency variation in the $x$ direction as in the filter of Fig. 1, but has a constant transparency in the $y$ direction. Also, the sinusoidal transparency variation in strip $3''$ is opposite in phase to that in strip $3'$. If this filter is moved over the face of screen 2 and it is arranged so that the light from the upper half of the screen passes through strip $3'$ only and that from the lower half passes through strip $3''$ only, and so that the light passing through both strips is received by the same photocell, the spectral components due to the two base lines $C_1$ and $C_2$ will cancel since the rectangular pulses formed by these lines have the same phases relative to the horizontal center line of the screen. However, since the phase of the time function in the lower half of the screen, relative to the screen center line, is opposite to that in the upper half, the spectral components due to the time function will not cancel.

The arrangement of Fig. 2 is capable of analyzing a time function at only one frequency or, at best, over only a limited band of frequencies determined by the practical variation of $a$ in equation (1). In order to analyze the time function over a band of frequencies a continuous variation of the frequency of the filter is required. In the filter 4 of Fig. 3 the light transmission of the filter varies sinusoidally in the $x$ direction but instead of at a constant frequency as in the filter of Figs. 1 and 2 the frequency increases continuously in a logarithmic manner as illustrated in the relationship between $x$ and $t_x$. If the extent of the time function on the screen of the oscilloscope is $a$, then the extent will contain one cycle on the filter at one end and ten cycles at the other. The frequency range of the filter in this case therefore is 10/1 and the time function may be analyzed over a continuous band of frequencies extending from $$\frac{1}{D} \text{ c./s. to } \frac{10}{D} \text{ c./s.}$$

where $D$ is the duration of the time function in seconds. The filter may, of course, be extended in length to produce any desired frequency range, a 10/1 range being shown for ease of illustration. For example, an extension of the filter in Fig. 3 by a length $a$ would increase the frequency range to 20/1 and a further extension of the same amount would increase the range to 40/1 etc. For investigating a time function at the lowest frequency of the spectrum approaching zero frequency or D. C., the low frequency end of the filter may take the form shown in Fig. 4. In the example shown the distance $a$ occupied by the time function on the oscilloscope screen contains 1/128 cycle of the filter sinusoidal transparency variation at the low frequency end. If, for example, the duration $D$ of the time function is ½ second the lowest frequency for which the Fourier integral would be evaluated is $$\frac{1}{128} \cdot \frac{1}{D} = \frac{1}{64} \text{ c./s.}$$

By this process zero frequency, or direct current, can be approached, however, it cannot be reached with a filter of finite length. In investigating frequencies below 1 c./s. it is preferable to use the cosine function in the filter rather than the sine function as in Fig. 3 since the cosine function approaches its maximum value below ¼ cycle whereas the sine function approaches zero.

When filters of the type shown in Figs. 3 and 4 are moved at constant speed across the oscilloscope screen containing the time function to be analyzed, the frequency by which the function is multiplied increases logarithmically with time. It is therefore necessary that the horizontal sweep of the oscilloscope likewise be logarithmic with respect to time.

With single frequency filters such as shown in Figs. 1 and 2, the single multiplying frequency passes through all phases from zero to $2\pi$ and therefore it passes through the phase for which the maximum output, or maximum value of the Fourier integral, for that particular frequency is obtained. This is not true for filters of the type shown in Figs. 3 and 4. Here the frequency and phase are continuously changing and therefore only at discrete frequencies in the spectrum will the phase be that required to give maximum output. Consequently, within every cycle of the phase variation one minimum and one maximum output of the integrator will appear and the maximum will be a measure of the total content in the time function of the component of the particular frequency at which the maximum was attained. All maxima are determined by the envelope of the time spectrum. Since the rise time in any part of the spectrum is correlated to the duration of the time function being investigated, it is possible to define the envelope with any required accuracy of the frequency change between maxima is small enough.

The above process is illustrated in Figs. 5 and 6. Fig. 5(A) illustrates a time function to be analyzed as it would appear on the persistent screen of the oscilloscope. The time base is logarithmic and the function base duration $a$. Fig. 5(B) illustrates the sinusoidal transparency variation of the filter and is similar to Fig. 3. As in Fig. 3, the frequency of the variation increases logarithmically in the $x$ direction. Fig. 5(C) shows the manner in which the phase varies as the filter passes over the time function on the screen of the oscilloscope. In the example shown, the filter has a total of nineteen cycles so that the phase varies from zero to $38\pi$ radians in accordance with curve 5. Since, however, the phase repeats after each $2\pi$ radians, the phase variation may also be represented by curve $5'$.

The phase-frequency scan $5'$ is reproduced on a larger scale in Fig. 6(A). For any nonperiodic time function there is a continuous function showing the phase of all components of the time function. For the transient of Fig. 5(A) this function has the form shown at 6 in Fig.

6(a). Each point of intersection between curves 5' and 6 therefore represents a frequency at which maximum output from the integrator will occur. These maxima are shown by curve 7 in Fig. 6(B) which curve represents the output of the integrator or photocell receiving the light passed by the filter as the filter moves completely across the time function or the oscilloscope screen. A point of minimum output occurs between each pair of adjacent maxima. These points represent frequencies at which the component phase and the filter phase are opposite. The zero line for curve 7 represents the constant light transmission of the filter. The envelope 8 of curve 7 represents the spectrum of the time function shown in Fig. 5(A).

A complete spectrum analyzer is shown in Fig. 7. The function to be analyzed is applied, in the form of a voltage that varies with time, to terminal 10 and thence through switch 11 to the vertical input terminal of oscilloscope 12. The oscilloscope contains a fan beam 13 having a constant divergence in the vertical plane and substantially zero thickness in the horizontal direction. Logarithmic sweep generator 14 produces a horizontal sweep voltage, the amplitude of which varies logarithmically with time. As already explained the logarithmic horizontal sweep is necessary because of the logarithmic frequency variation of the filter. The oscilloscope has a persistent screen 2 and the image formed thereon is of the same type as described in connection with Fig. 2.

The filter is made of upper and lower strips 15 and 15' in the form of cylindrical surfaces. The frequency variation is logarithmic as in the case of filter 4 of Fig. 3, and the two strips have opposite space phases as in Fig. 2. In order to insure that each strip passes light from one half only of the functions on the oscilloscope screen an image of the screen is formed in the plane of the filter by lens 16. The image is so adjusted that the rectangular light area formed by the horizontally scanning beam in the absence of vertical input extends equally above and below the junction of upper and lower strips 15 and 15' of the optical filter. The light passing through both strips is collected by photocell 17.

In the preceding discussions the decay of the light emitted by the oscilloscope screen was disregarded. In a practical analyzer, however, this constitutes a source of error which must be compensated. In the analyzer of Fig. 7 this compensation is provided for by a second photocell 17' which has an image of the screen 2 formed thereon by lens 18. The output of the photocell, which is a voltage that varies as the total illumination of the screen, is used to control the amplification of variable gain amplifier 19 through which the output of photocell 17 passes. If the arrangement is made such that the gain of amplifier 19 increases in proportion to the decrease in total illumination of the screen, the signal produced by photocell 17 as it appears in the output of amplifier 19 will be free from the effects of illumination decay.

The filters 15—15' are rotated at constant speed by motor 20. Horizontal synchronizing pulse generator 21 is coupled to the filter shaft by any suitable coupling means 22 and produces a horizontal synchronizing pulse at the start of each filter cycle. This pulse is applied to the horizontal synchronizing circuits of oscilloscope 23 so that one linear sweep is produced for each rotation of the filter.

The output of amplifier 19 is rectified by rectifier 27, the output of which is smoothed by low pass filter 24 and applied to the vertical deflection circuit of oscilloscope 23. A representative output from rectifier 27 is shown in Fig. 8 by curve 25. The output contains one maximum value for each passage of the filter transparency variation through $2\pi$ radians as shown by this curve and as explained in connection with Fig. 6. The output of the low pass filter 24 is a continuous curve 26 which is displayed on the screen of oscilloscope 23 and repre-
sents the spectrum of the function over a band of frequencies determined by the constants of the filter, the physical length of the time function $a$ as defined in Fig. 2 and the duration D of the time function as already explained. In the analyzer of Fig. 7, the distance $a$ is, of course, measured on the image of the function formed in the plane of the filter.

The horizontal or frequency axis of the oscilloscope 23 may be calibrated in two ways:

(1) If the duration D of the time function is known and if the least number $N_1$ and the greatest number $N_2$ of filter cycles contained in the distance $a$ is known, then the lowest frequency $f_1$ and the highest frequency $f_2$ are:

$$f_1 = N_1 \cdot \frac{1}{D}$$

$$f_2 = N_2 \cdot \frac{1}{D}$$

Since the frequency scale is logarithmic the intermediate frequencies can be readily located.

(2) Two or more known sinusoidal frequencies may be applied to the vertical input of oscilloscope 12 through switch 11. With these frequencies spotted on the horizontal axis the remaining divisions of the logarithmic scale may be computed.

The filter may take other than the cylindrical form shown in Fig. 2. For example, it may be constructed as a disc as shown in Fig. 7a. For maximum accuracy with this arrangement a polar display of the time function on the screen of the oscilloscope should be used. The speed of rotation of the filter in any case should be high enough to prevent flicker on the screen of oscilloscope 23.

It is not necessary that the pulse to be investigated be displayed on the screen of a cathode ray tube as in Fig. 7. Any other method of projecting the function as an area of light on the filter, such as a projection from a drawing or photograph, may be used. Further, if the function is available on a drawing or photograph as a line, like on the screen 2 in Fig. 1, the projecting means may optically split the light from the representation to form two images on the upper and lower filter strips of Fig. 7. In this case each filter strip will have a grey wedge added, as in filter 3 of Fig. 1, with the wedges of the two strips oppositely placed. This is illustrated in Fig. 9 with the two images superimposed in dotted lines on the filter.

The filters may best be constructed by photographic methods. They may be constructed a line at a time from calculated exposures along a calculated time axis. An image of a fine line of light may be formed transversely of the film or else the lines may be formed by a minute scanning spot. A sufficient number of lines are used to give the required resolution. Once a master has been made, any number of duplicate filters may be obtained therefrom.

I claim:

1. A spectrum analyzer comprising a spatial optical filter having a time axis and a transparency that varies sinusoidally along said time axis, means for forming an optical image of an amplitude-time function on said filter, said image having a time axis parallel to said filter time axis and an amplitude axis normal thereto, means for moving said filter relative to said image at constant speed and in the direction of said time axes, a photocell arranged to receive all the light from said image passing through said filter, and means for displaying the output of said photocell as a function of the position of said filter relative to said image.

2. Apparatus as claimed in claim 1 in which the frequency of said sinusoidal transparency variation increases logarithmically along said filter time axis and in which the time axis of said image also has a logarithmic scale.

3. A spectrum analyzer comprising a spatial optical filter having a time axis and a transparency that varies sinusoidally along said time axis on either side thereof, the sinusoidal variation on one side of said axis being opposite in phase to that on the other side; means for forming an optical image of an amplitude-time function on said filter, said optical image having a time axis and an amplitude axis at right angles thereto, said function being represented as oppositely phased amplitude variations on either side of said time axis, the time axis of said image being superimposed on the time axis of said filter; means for moving said filter relative to said image at constant speed and in the direction of said time axes, a photocell arranged to receive all the light from said image passing through said filter, and means for displaying the output of said photocell as a function of the position of said filter relative to said image.

4. A spectrum analyzer comprising a spatial optical filter having a time axis and a transparency on either side thereof that varies sinusoidally in the direction of said time axis and is constant in the direction at right angles thereto, the sinusoidal variation on one side of said axis being opposite in phase to that on the other side; means for forming an optical image of an amplitude-time function on said filter, said optical image having a time axis and an amplitude axis at right angles thereto and being in the form of an area of light extending on either side of said time axis, the distances between said time axis and the edges of said area located on opposite sides thereof varying along said time axis directly as the amplitude of said function in one case and inversely as the amplitude of said function in the other case, the time axis of said image being superimposed on the time axis of said filter; means for moving said filter relative to said image at constant speed and in the direction of said time axes; a photocell arranged to receive all the light from said image passing through said filter, and means for displaying the output of said photocell as a function of the position of said filter relative to said image.

5. Apparatus as claimed in claim 4 in which the frequency of said sinusoidal transparency variations increases logarithmically along said filter time axis and in which the time axis of said image also has a logarithmic scale.

6. A spectrum analyzer comprising a spatial optical filter having a time axis and a transparency on either side thereof that varies sinusoidally in the direction of said time axis and that increases linearly in a direction at right angles thereto, the sinusoidal variation on one side being opposite in phase to that on the other side; means for forming an optical image of an amplitude-time function on said filter, said image consisting of two traces located on opposite sides of said time axis, the distances from said traces to said time axis varying along said time axis directly as the amplitude of said function in one case and inversely as the amplitude of said function in the other case; means for moving said filter relative to said image at constant speed and in the direction of said time axis; a photocell arranged to receive all the light from said image passing through said filter; and means for displaying the output of said photocell as a function of the position of said filter relative to said image.

7. Apparatus as claimed in claim 6 in which the frequency of said sinusoidal transparency variations increases logarithmically along said filter time axis and in which the time axis of said image also has a logarithmic scale.

8. A spectrum analyzer comprising a first oscilloscope having a cathode ray tube and means for vertically and horizontally deflecting the electron beam of said tube, said beam having a very small horizontal dimension but a comparatively large vertical dimension; means for applying a time function to be analyzed to said vertical deflecting means; means synchronized with said applied function for producing a horizontal deflection of said beam, said horizontal deflection being logarithmic with respect to time; a spatial optical filter having a time axis and a transparency on either side thereof that varies sinusoidally in the direction of said time axis, the frequency of said sinusoidal variations increasing logarithmically along said time axis and the sinusoidal variation on one side of said axis beng opposite in phase to that on the other side; means for forming an optical image of the first oscilloscope screen on said filter such that the image of said beam, in the absence of vertical deflection, extends equally on each side of said time axis; a photocell positioned to receive all the light from said image passing through said filter; means for moving said filter relative to said image at constant speed and in the direction of said time axis; and means for displaying the output of said photocell as a function of the position of said filter relative to said image.

9. Apparatus as claimed in claim 8 in which the last named means comprises a second oscilloscope having vertical and horizontal deflecting circuits, means for applying the output of said photocell to said vertical deflecting circuit; and means coupled between said filter moving means and said horizontal deflecting circuit to synchronize the horizontal deflection of the beam of said second oscilloscope with the movement of said filter.

10. Apparatus as claimed in claim 9 in addition to which there are provided a second filter; means for forming an image of the screen of said first oscilloscope on said second filter; a variable gain device situated between the first mentioned filter and said vertical deflection circuit; and means for controlling the gain of said variable gain device in inverse relation to the output of said second filter.

References Cited in the file of this patent

UNITED STATES PATENTS

| | | |
|---|---|---|
| Re. 21,533 | Stoekle et al. | Aug. 13, 1940 |
| 2,179,000 | Tea | Nov. 7, 1939 |
| 2,243,600 | Hulst | May 27, 1941 |
| 2,360,883 | Metcalf | Oct. 24, 1944 |
| 2,410,550 | Padva | Nov. 5, 1946 |
| 2,495,790 | Valensi | Jan. 31, 1950 |
| 2,557,691 | Rieber | June 19, 1951 |
| 2,718,608 | Laws | Sept. 20, 1955 |